United States Patent
Hori et al.

(10) Patent No.: US 8,746,977 B2
(45) Date of Patent: Jun. 10, 2014

(54) SLIDE BEARING, SLIDE BEARING UNIT WITH SAME, AND MOTOR WITH THE BEARING UNIT

(75) Inventors: Masaharu Hori, Kuwana (JP); Natsuhiko Mori, Kuwana (JP); Wei Shin Sim, Kuwana (JP)

(73) Assignee: NTN Corporation, Osaka-shi (JP)

( * ) Notice: Subject to any disclaimer, the term of this patent is extended or adjusted under 35 U.S.C. 154(b) by 87 days.

(21) Appl. No.: 13/389,189

(22) PCT Filed: Jul. 30, 2010

(86) PCT No.: PCT/JP2010/062949
§ 371 (c)(1),
(2), (4) Date: Feb. 6, 2012

(87) PCT Pub. No.: WO2011/024604
PCT Pub. Date: Mar. 3, 2011

(65) Prior Publication Data
US 2012/0133226 A1 May 31, 2012

(30) Foreign Application Priority Data
Aug. 28, 2009 (JP) ................. 2009-198349

(51) Int. Cl.
*F16C 32/06* (2006.01)
(52) U.S. Cl.
USPC ........................ 384/100; 384/114; 384/119
(58) Field of Classification Search
USPC ......... 384/100, 107, 111–114, 116, 118, 119, 384/121, 123, 124; 310/90; 360/99.08
See application file for complete search history.

(56) References Cited

U.S. PATENT DOCUMENTS 5,533,812 A * 7/1996 Leuthold et al. .............. 384/112
(Continued)

FOREIGN PATENT DOCUMENTS

| CN | 101321963 A | 12/2008 |
|---|---|---|
| JP | 7-332353 A | 12/1995 |

(Continued)

OTHER PUBLICATIONS

Machine translation of JP 2004-293685 obtained on Oct. 1, 2013.*
(Continued)

*Primary Examiner* — Marcus Charles
*Assistant Examiner* — Adam D Rogers
(74) *Attorney, Agent, or Firm* — Westerman, Hattori, Daniels & Adrian, LLP

(57) ABSTRACT

Provided is a bearing capable of satisfying demands for cost reduction and further quietness, and stably maintaining high support accuracy. A sliding bearing (4) includes an inner member (5) having a mounting surface (9) with respect to a rotary shaft (2), and an outer member (6) being arranged on a radially outer side of the inner member (5). A radial bearing gap is formed between an outer peripheral surface (5a1) of the inner member (5) and an inner peripheral surface (7a1) of the outer member (6), and a lubricating oil is interposed in the radial bearing gap. Further, between the inner member (5) and the outer member (6), sealing gaps (S, S) for maintaining an oil level of the lubricating oil on both axial sides of the radial bearing gap are formed. At least a part of the mounting surface (9) of the inner member (5) is made of a metal.

5 Claims, 8 Drawing Sheets

(56) References Cited

U.S. PATENT DOCUMENTS

| | | | |
|---|---|---|---|
| 5,880,545 A * | 3/1999 | Takemura et al. | 310/90 |
| 6,019,516 A | 2/2000 | Leuthold et al. | |
| 8,052,328 B2 * | 11/2011 | Hibi | 384/322 |
| 2009/0046960 A1 * | 2/2009 | Hibi et al. | 384/107 |
| 2012/0315169 A1 * | 12/2012 | Hori et al. | 417/423.12 |

FOREIGN PATENT DOCUMENTS

| | | | |
|---|---|---|---|
| JP | 2000-249142 A | | 9/2000 |
| JP | 2003-239976 A | | 8/2003 |
| JP | 2004-293685 A | | 10/2004 |
| JP | 2007-24089 A | | 2/2007 |
| JP | 2007051717 A | * | 3/2007 |
| WO | 2007/015594 A1 | | 2/2007 |

OTHER PUBLICATIONS

International Search Report of PCT/JP2010/062949, mailing date of Nov. 2, 2010.

Notification of Transmittal of Translation of the International Preliminary Report on Patentability (Form PCT/IB/338) of International Application No. PCT/JP2010/062949 mailed Mar. 22, 2012 with Forms PCT/IB/373 and PCT/ISA/237.

Notification of Transmittal of Translation of the International Preliminary Report on Patentability (Form PCT/IB/338) of International Application No. PCT/JP2010/062949 mailed Apr. 19, 2012 with Forms PCT/IB/373 and PCT/ISA/237; (10 pages).

Office Action dated Dec. 18, 2013, issued in Chinese application No. 201080038250.4, w/ partial English translation.

Extended European Search Report "EESR" dated Jan. 7, 2014, corresponding to European Patent Application No. 10811655.9.

* cited by examiner

SLIDE BEARING, SLIDE BEARING UNIT WITH SAME, AND MOTOR WITH THE BEARING UNIT

BACKGROUND OF THE INVENTION

1. Field of the Invention

The present invention relates to a sliding bearing, a sliding bearing unit including the same, and a motor including the bearing unit.

2. Description of Related Art

For example, a bearing is incorporated in motors to be mounted to electric devices such as an exhaust fan, and the bearing supports a rotary-side member (for example, rotary shaft of the motor) with respect to a static-side member in a freely rotatable manner. For uses of this type, there has been suitably used what is called a rolling bearing including the following as components: an outer race; an inner race; a plurality of rolling elements arranged between the inner and outer races; and a retainer for equiangularly retaining the rolling elements (for example, refer to Patent Literature 1).

CITATION LIST

Patent Literature 1: JP 2000-249142 A

SUMMARY OF INVENTION

Technical Problems

By the way, in recent years, houses are becoming more and more airtight. Meanwhile, along with use of chemical-scattering building materials and prevalence of air conditioners, an increase in the number of people who develop what is called sick building syndrome is regarded as a problem. Thus, based on the present Building Standards Act, there is an obligation to install what is called a 24-hour ventilation system for actively and forcibly performing air supply and air exhaust in a house. A main part of this system is built by small exhaust fans installed in respective dwelling rooms, and hence cost reduction of the exhaust fans is an effective measure for reduction of cost for building the system. However, as described above, a roller bearing to be incorporated into exhaust fan motors is formed of a large number of members. Thus, reduction of cost therefor is limited, which is an obstacle to price reduction of the motors, and by extension, of the exhaust fans.

Further, basically, the exhaust fans in the above-mentioned system are continuously operated, and hence particularly demanded to be low-noise. However, the roller bearing inevitably involves what is called retainer noise generated by collision of a pocket of a retainer and rolling elements during operation, and friction noise generated when the rolling elements roll on raceway surfaces of inner and outer races. Thus, it is difficult to meet the demand for further quietness.

Meanwhile, the above-mentioned problems are probably alleviated or solved, for example, with use of a cylindrical sliding bearing. However, in this case, there is a risk that desired support accuracy cannot be stably maintained depending on accuracy of an outer peripheral surface of the rotary-side member.

It is a main object of the present invention to provide a bearing capable of satisfying demands for cost reduction and further quietness, and stably maintaining high support accuracy.

Solution to Problems

In order to achieve the above-mentioned object, as a first aspect of the present invention, the present invention provides a sliding bearing, including: an inner member having a mounting surface with respect to a rotary-side member and a projecting portion projecting in a radial direction, at least a part of the mounting surface being made of a metal; an outer member arranged on a radially outer side of the inner member and having a mounting surface with respect to a static-side member and a pair of flange portions engageable with both end surfaces of the projecting portion; a radial bearing gap which is formed between an outer peripheral surface of the projecting portion and an inner peripheral surface of the outer member in accordance with rotation of the rotary-side member, and in which a lubricating oil is interposed, the inner peripheral surface facing the outer peripheral surface; and sealing gaps for sealing both axial sides of the radial bearing gap, the sealing gaps being formed of inner peripheral surfaces of the pair of flange portions.

As described above, the bearing according to the present invention is a sliding bearing including a main part formed of two members: the inner member and the outer member. Thus, the number of components can be markedly reduced in comparison with that of the roller bearings, and hence the demand for cost reduction can be satisfied. Further, in accordance with the rotation of the rotary-side member, the radial bearing gap, in which the lubricating oil is interposed, is formed between the inner member and the outer member. Thus, by an oil film of the lubricating oil, which is formed in the radial bearing gap, the rotary-side member (inner member) can be supported with respect to the static-side member (outer member) in a non-contact manner. Therefore, frequency of contact of the members during operation is reduced, with the result that quietness can be enhanced. In addition, the rotary-side member is supported with respect to the static-side member in a non-contact manner through intermediation of the inner member. Thus, when shape accuracy of the inner member is enhanced in advance, high rotational accuracy of the rotary-side member is maintained irrespective of shape accuracy (in particular, accuracy of the outer peripheral surface) of the rotary-side member.

Further, the sliding bearing according to the present invention has the sealing gaps for (maintaining an oil level of the lubricating oil and) sealing both the axial sides of the radial bearing gap, and hence the lubricating oil interposed in the radial bearing gap is effectively prevented from leaking to the outside. Thus, desired bearing performance can be stably maintained. In particular, each of the sealing gaps has a seal structure of what is called a non-contact type in which the lubricating oil is prevented from leaking to the outside without bringing the members into contact with each other. Thus, generation of abnormal noise and an increase in rotational torque, which may become problems in a case where a seal structure of what is called a contact type is employed, are not involved, and high rotational accuracy is stably maintained.

By the way, for example, when the entirety of the inner member is made of a resin and the inner member is press-fitted to the rotary-side member, there is a risk that creep occurs along with the elapse of time and mounting strength of the inner member with respect to the rotary-side member is deteriorated. Further, when the entirety of the inner member is made of a resin and the inner member is fixed to the rotary-side member by bonding, there is a risk that required mounting strength cannot be secured. In contrast, as in the present invention, when at least a part of the mounting surface with respect to the rotary-side member, which is provided to the inner member, is made of a metal, it is possible to solve the above-mentioned problems and secure required fixing strength of the inner member with respect to the rotary-side member. Thus, desired bearing performance can be stably maintained over a long period of time.

When the projecting portion projecting in the radial direction is provided to the inner member and when the pair of flange portions engageable with both the end surfaces of the projecting portion are provided to the outer member, the inner member and the outer member are engaged with each other in the axial direction, and hence prevented from being separated from each other. As a result, a bearing structure with high reliability is achieved. Further, the radial bearing gap is formed between the outer peripheral surface of the projecting portion and the inner peripheral surface of the outer member, the inner peripheral surface facing the outer peripheral surface, and the sealing gaps are formed by the inner peripheral surfaces of the pair of flange portions forming the outer member. With this, the radial bearing gap can be positioned on a radially outer side, and the sealing gaps can be positioned on a radially inner side in comparison with those in the following case: the projecting portion is provided to the outer member; the radial bearing gap is formed between an inner peripheral surface of the projecting portion and an outer peripheral surface of the inner member, the outer peripheral surface facing the inner peripheral surface; and the sealing gaps are formed between outer peripheral surfaces of the flange portions and the inner peripheral surfaces of the inner members, the inner peripheral surfaces facing the outer peripheral surfaces. Thus, it is possible to increase a support area of the radial bearing portion, and hence to enhance rotational accuracy in the radial direction. In addition, during the rotation of the rotary-side member, a centrifugal force acting on the lubricating oil (oil level) retained in the sealing gaps is reduced, with the result that the lubricating oil is more effectively prevented from leaking from the sealing gaps.

In the sliding bearing structured as described above, when the outer member is a product formed by injection molding of a resin, cost reduction of the bearing can be achieved. Note that, even when the entirety of the outer member is formed by injection molding of a resin, further, even when the entirety of the mounting surface with respect to the static-side member is made of a resin, a situation in which reliability of the sliding bearing according to the present invention is reduced is less likely to occur. This is because, even when the entirety of the inner member is made of a resin, regarding the outer member to be mounted to the static-side member, it is not necessary to consider the above-mentioned problem of creep.

When the entirety of the inner member is made of a metal material such as stainless steel, the fixing strength of the inner member with respect to the rotary-side member is sufficiently secured, and hence desired bearing performance can be stably maintained. However, such a structure inevitably involves high material cost and manufacturing cost. As an example of means for suppressing cost while securing the fixing strength of the inner member with respect to the rotary-side member, the following may be given: forming the inner member by injection molding of a resin together with a core metal as an insert component; and exposing the core metal to the mounting surface with respect to the rotary-side member. With this, the inner member is partially made of a resin, and hence material cost can be reduced. Simultaneously, mass production cost can be reduced. In addition, the fixing strength with respect to the rotary-side member is secured by the core metal exposed to the mounting surface. In this case, when the thickness, the shape, the arrangement, and the like of the core metal are appropriately set in advance, a resin portion (part formed by injection molding of a resin) can be made uniform in thickness. Thus, an adverse effect which may be caused in a case where the thickness of the resin portion locally varies from each other, specifically, a situation in which variation in molding shrinkage amount may cause deterioration of shape accuracy, and a situation in which shape accuracy is deteriorated along with a temperature change during operation are prevented to the extent possible.

The inner member may include: a porous portion made of a sintered metal; and a molded portion formed by injection molding of a resin together with the porous portion as an insert component, the porous portion being exposed to a surface to form the radial bearing gap (between the surface and the outer member) and to the mounting surface with respect to the rotary-side member, the molded portion covering surfaces of the porous portion of which the surfaces being exposed to an outside of the sliding bearing. According to such a structure, the fixing strength of the inner member with respect to the rotary-side member is satisfied, and ample lubricating oil is constantly interposed in the radial bearing gap. As a result, rotational accuracy in the radial direction is stably maintained. This is because, in accordance with the rotation of the rotary-side member, a centrifugal force acts on the lubricating oil retained by a porous composition (inner pores) of the inner member, and hence the lubricating oil actively seeps into the radial bearing gap. Further, when the surfaces of the porous portion, which are exposed to the outside of the bearing, are covered with the molded portion, the lubricating oil can be prevented from leaking from surface pores of the porous portion even without additional pore sealing treatment. Thus, deterioration of bearing performance, which is derived from insufficiency of lubricating oil, can be effectively prevented.

Further, in order to achieve the above-mentioned object, as a second aspect of the present invention, there is provided a sliding bearing, including: an inner member having a mounting surface with respect to a rotary-side member and a projecting portion projecting in a radial direction; an outer member arranged on a radially outer side of the inner member and having a mounting surface with respect to a static-side member and a pair of flange portions engageable with both end surfaces of the projecting portion; and a radial bearing gap which is formed between an outer peripheral surface of the projecting portion and an inner peripheral surface of the outer member in accordance with rotation of the rotary-side member, and in which a lubricating oil is interposed, the inner peripheral surface facing the outer peripheral surface, in which the inner member is formed of a porous body of a sintered metal, and includes: a low density portion provided on a radially inner side; and a high density portion provided on a radially outer side, the high density portion forming the radial bearing gap together with the outer member, and in which the lubricating oil is flowable between the low density portion and the high density portion. Note that, herein, whether the density is high or low is defined by a value (inner-pore rate) obtained by dividing the total capacity of inner pores by the volume.

According to the sliding bearing structured as described above, in addition to functions and effects obtained by the sliding bearing according to the above-mentioned first aspect of the present invention, the following advantages can be obtained. The high density portion is arranged to face the radial bearing gap, and hence what is called pressure absence is suppressed. As a result, bearing rigidity in the radial direction can be enhanced. Further, for example, when the bearing is stopped, the lubricating oil retained in the inner pores of the low density portion is drawn-in toward the high density portion by a capillary force, and hence leakage of the lubricating oil to the outside is more effectively suppressed or prevented. In this case, when a suction effect and a retention effect of the high density portion with respect to the lubricating oil are sufficiently obtained, even without provision of special seal structures (such as the above-mentioned sealing gaps), the lubricating oil is effectively prevented from leaking to the outside. Thus, there is an advantage that the bearing structure can be simplified. As a matter of course, the sealing gaps may be provided also in the sliding bearing according to the second aspect of the present invention. In that case, as in the sliding bearing according to the first aspect of the present invention, the sealing gaps can be formed of the pair of flange portions forming the outer member.

In the sliding bearing according to any one of the above-mentioned aspects, in accordance with the rotation of the rotary-side member, a thrust bearing gap may be formed between one end surface of both the end surfaces of the projecting portion and an end surface of one of the pair of flange portions, the end surface facing the one end surface, the lubricating oil being interposed in the thrust bearing gap. With this, the rotary-side member (inner member) can be supported with respect to the static-side member (outer member) in a non-contact manner in one thrust direction by an oil film to be formed in the thrust bearing gap. Thus, support accuracy can be further enhanced without deterioration of quietness.

Further, in accordance with the rotation of the rotary-side member, another thrust bearing gap may be formed between another end surface of both the end surfaces of the projecting portion and an end surface of another of the pair of flange portions, the end surface facing the another end surface, the lubricating oil being interposed in the another thrust bearing gap. In this case, the rotary-side member can be supported with respect to the static-side member in a non-contact manner in another thrust direction. Thus, support accuracy can be further enhanced.

Further, in the sliding bearing according to the first aspect of the present invention, the inner member may be made of a sintered metal, and the outer member may be formed by injection molding of a resin together with the inner member as an insert component, the resin undergoing molding shrinkage in a direction of radially increasing the inner peripheral surface of the outer member.

In this way, when the outer member is formed by injection molding of the resin together with the sintered-metal inner member as an insert component, the resin undergoing molding shrinkage in the direction of radially increasing the inner peripheral surface of the outer member, by appropriately setting molding conditions (resin injection condition and the like) of the outer member, gaps each having a width corresponding to a gap width of the radial bearing gap can be formed between the inner member and the outer member in accordance with the molding shrinkage of the outer member. Thus, time and effort for separately producing and assembling, with high accuracy, the inner member and the outer member are saved, and simultaneously, the radial bearing gap can be formed between the inner member and the outer member. Further, the inner member as an insert component is made of a sintered metal. Thus, as described above, the fixing strength of the inner member with respect to the rotary-side member is sufficiently secured. Simultaneously, during the rotation of the rotary-side member, ample lubricating oil can be interposed in the radial bearing gap. Thus, desired bearing performance can be stably maintained over a long period of time. Note that, liquid crystal polymer (LCP) can be cited as an example of the resin that undergoes molding shrinkage in the direction of radially increasing the inner peripheral surface.

Still further, in the sliding bearing according to the first aspect of the present invention, the inner member may be made of a sintered metal, and the outer member may be formed by injection molding of a resin together with the inner member and a core metal arranged on the radially outer side of the inner member as insert components, the core metal being made to face the radial bearing gap. The inventors of the present invention have found out the following advantages in this case, which cannot be achieved in the case where the outer member is formed by injection molding of the resin together with the sintered-metal inner member as an insert component, the resin undergoing molding in the direction of radially increasing the inner peripheral surface of the outer member.

Specifically, it has been found out that, by forming the outer member by injection molding of a resin in the above-mentioned form, a radial bearing gap can be formed between the outer peripheral surface of the inner member and the inner peripheral surface of the core metal even when the outer member is not formed by injection molding of the resin that undergoes molding in the direction of radially increasing the inner peripheral surface of the outer member, and in addition, the radial bearing gap thus obtained has much higher accuracy. This is partially because, even when the outer member is formed by injection molding of a resin, the shape and the dimensional accuracy of the core metal do not vary, and higher rigidity of the outer member is achieved.

As described above, when the outer member is formed by injection molding of a resin together with the inner member as an insert component (additionally, core metal arranged on the radially outer side of the inner member), both the end surfaces of the inner member can be formed as tapered surface inclined radially outward in a direction of coming close to each other, and the pair of flange portions covering the tapered surfaces can be formed by injection molding (of a resin) integrally with the outer member. With this, inner surfaces of both the pair of flange portions are formed as tapered surfaces in conformity with shapes of the end surfaces of the inner member. Thus, when the pair of flange portions undergo molding shrinkage, in accordance therewith, gaps inclined radially outward in the direction of coming close to each other (inclined gaps) are formed on both the axial sides of the inner member. During the rotation of the rotary-side member, the rotary-side member is supported with respect to the static-side member in a non-contact manner also by oil films of the lubricating oil, which are formed in the inclined gaps. The oil films of the lubricating oil, which are formed in the inclined gaps, have component forces in the radial direction and the thrust direction, and hence rotational accuracy can be further enhanced.

In this case, the sealing gaps can be formed between the inner peripheral surfaces of the pair of flange portions of the outer member and the outer peripheral surfaces of the rotary-side member. In this case, the sealing gaps can be formed of two non-porous surfaces, and hence stable sealing performance can be secured. Note that, the seal surface to be provided on the flange-portion-pair side (one of two surfaces forming each of the sealing gaps) can be obtained by molding, or can be obtained by making use of molding shrinkage.

In a case where the sliding bearing according to any one of the above-mentioned aspects includes a plurality of sliding bearings arranged apart in the axial direction, by arranging a motor rotor between the plurality of sliding bearings adjacent to each other, a sliding bearing unit can be formed. The sliding bearing unit can be suitably incorporated into a motor, in particular, a motor for an exhaust fan to be installed in a dwelling room of a house. This is because the sliding bearings constituting the sliding bearing unit are low-cost and excellent in quietness as described above. In other words, by incorporating the sliding bearing unit as it is into motors in which roller bearings have been conventionally used, demands for cost reduction and further quietness with respect to motors of this type can be simultaneously satisfied.

Note that, a method for using the sliding bearing according to the present invention for the purpose of supporting rotation of the exhaust fan motor is described below. Specifically, a diameter dimension and an axial dimension of the outer member are set to dimensions conforming to a diameter series and a width series of roller bearings according to JIS B1512, and an inner diameter dimension of the inner member is set to a dimension conforming to an inner diameter dimension of an inner race of the roller bearings. With this, the roller bearing can be easily replaced with the sliding bearing.

Advantageous Effects of Invention

As described above, according to the present invention, it is possible to provide a bearing capable of satisfying demands for cost reduction and further quietness, and stably maintaining high support accuracy regardless of accuracy of the outer peripheral surface of the rotary-side member.

DESCRIPTION OF EMBODIMENTS

In the following, description is made of embodiments of the present invention with reference to the drawings.

Figure 1:
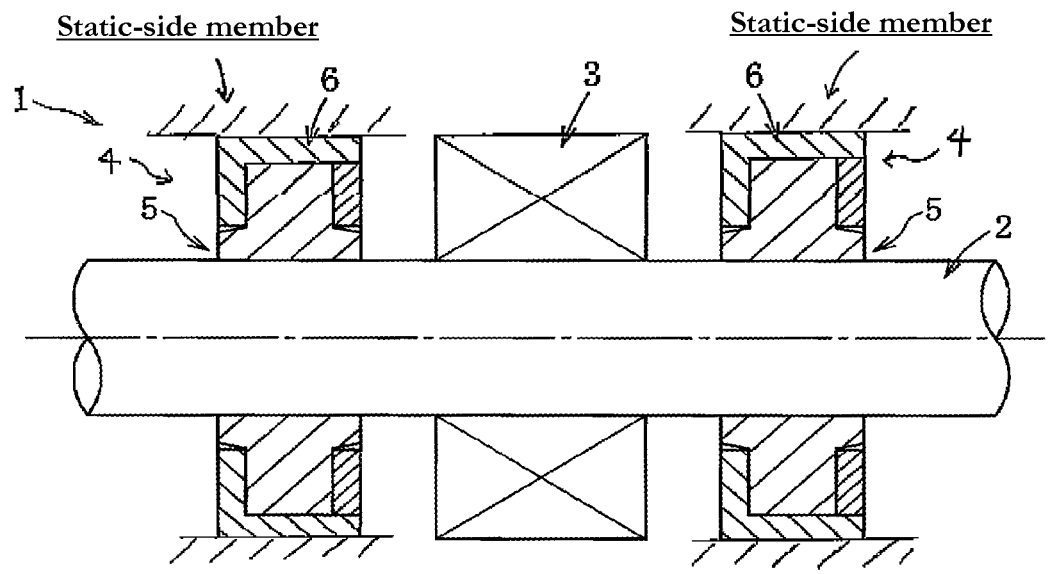
[FIG. 1] An axial sectional view of a sliding bearing unit incorporating sliding bearings according to the present invention.

FIG. 1 is an axial sectional view of a sliding bearing unit 1 incorporating sliding bearings according to the present invention. The sliding bearing unit 1 illustrated in FIG. 1 includes the following as components: a rotary shaft 2 as a rotary-side member; a pair of sliding bearings 4 and 4 arranged apart at two points in an axial direction; and a motor rotor 3 arranged between the sliding bearings 4 and 4 and fixed to an outer peripheral surface of the rotary shaft 2. The sliding bearing unit 1 is used, for example, by being incorporated into a motor for an exhaust fan to be installed in a dwelling room of a house (more strictly speaking, inner-rotor motor for an exhaust fan). At one end of the rotary shaft 2, a fan (blades) (not shown) is provided integrally with or separately from the rotary shaft 2.

Figure 2:
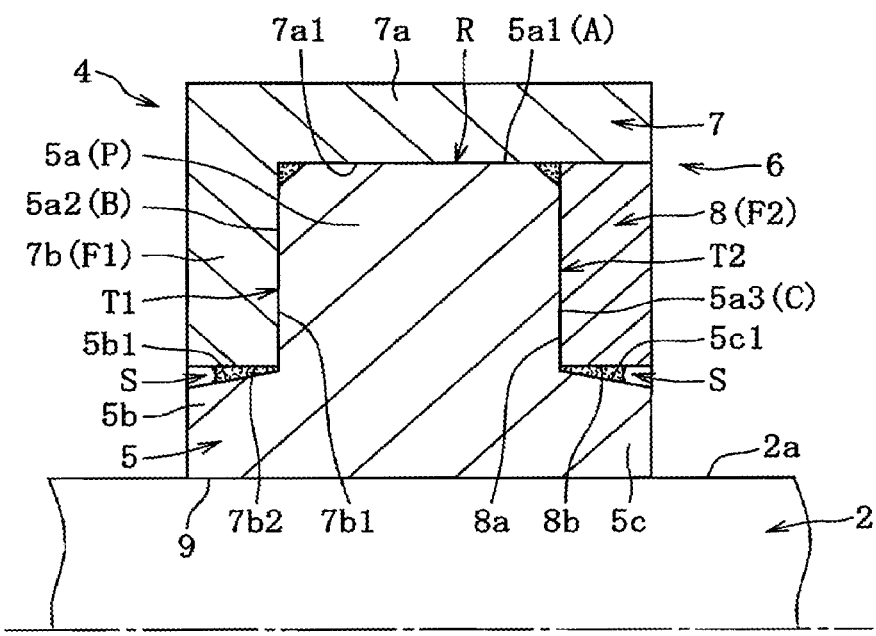
[FIG. 2] A sectional view of the sliding bearing according to a first embodiment of the present invention.

FIG. 2 is a sectional view of the sliding bearing 4 according to a first embodiment of the present invention, illustrating one of the sliding bearings 4 provided on the left side of FIG. 1 on an enlarged scale. The sliding bearing 4 illustrated in FIG. 2 includes the following as components: an inner member 5 provided with an inner peripheral surface having a mounting surface 9 with respect to the rotary shaft 2; and an outer member 6 arranged on a radially outer side of the inner member 5 and provided with an outer peripheral surface having a mounting surface with respect to a static-side member (see FIG. 1) (for example, housing). Lubricating oil is interposed between surfaces of the inner member 5 and the outer member 6, the surfaces facing each other in the axial direction and a radial direction. Note that, the sliding bearing arranged on the right side of FIG. 1 has the same structure as that of the sliding bearing 4 illustrated in FIG. 2, and hence detailed description thereof is omitted.

The inner member 5 is made of a metal material such as stainless steel or brass and formed into a substantially cylindrical shape. The inner member 5 integrally includes a thick portion 5a, and a first thin portion 5b and a second thin portion 5c which are arranged on both axial sides of the thick portion 5a and formed radially thinner than the thick portion 5a. The thick portion 5a projects to a radially outer side with respect to the thin portions 5b and 5c so that an outer diameter dimension of the thick portion 5a is larger than outer diameter dimensions of the thin portions 5b and 5c. In this way, a projecting portion P is formed. The inner peripheral surface of the inner member 5 is formed as a radially-uniform cylindrical surface, and the mounting surface 9 with respect to the rotary shaft 2 is provided over a part or the entirety of the inner peripheral surface. The inner member 5 is fixed to the rotary shaft 2 by, for example, press-fitting (light press-fitting) the mounting surface 9 to the rotary shaft 2 or interposing an adhesive between the mounting surface 9 and the rotary shaft 2.

On an outer peripheral surface 5a1 of the thick portion 5a as the projecting portion P, there is provided a radial bearing surface A to form a radial bearing gap between the outer peripheral surface 5a1 and an inner peripheral surface of the outer member 6, which faces the outer peripheral surface 5a1. In this embodiment, a radial dynamic pressure generating portion formed of dynamic pressure grooves and the like is not formed in the radial bearing surface A, and the thick portion 5a is formed into a shape of a radially-uniform smooth cylindrical surface.

Figure 3A:
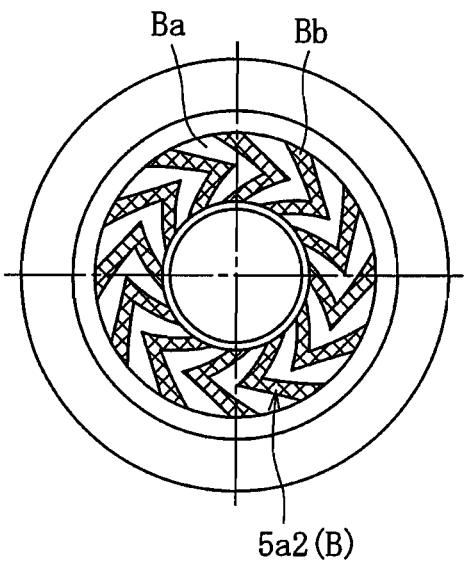
[FIG. 3A] A view of one end surface of an inner member illustrated in FIG. 2.

On a first end surface (end surface on the left side of FIG. 2) 5a2 of the thick portion 5a, there is provided an annular thrust bearing surface B to form a first thrust-bearing gap between the first end surface 5a2 and an end surface of the outer member 6, which faces the first end surface 5a2. On the thrust bearing surface B, there is formed a thrust dynamic pressure generating portion for generating a dynamic pressure action with respect to the lubricating oil interposed in the first thrust-bearing gap. As illustrated in FIG. 3A, the thrust dynamic pressure generating portion is formed of dynamic pressure grooves Ba each bent into a V-shape, and projecting peak portions Bb (indicated by cross-hatching in FIG. 3A) defining the dynamic pressure grooves Ba, the dynamic pressure grooves Ba and the peak portions Bb being alternately arrayed in a circumferential direction. The thrust dynamic-pressure generating portion exhibits a herringbone pattern as a whole.

Figure 3B:
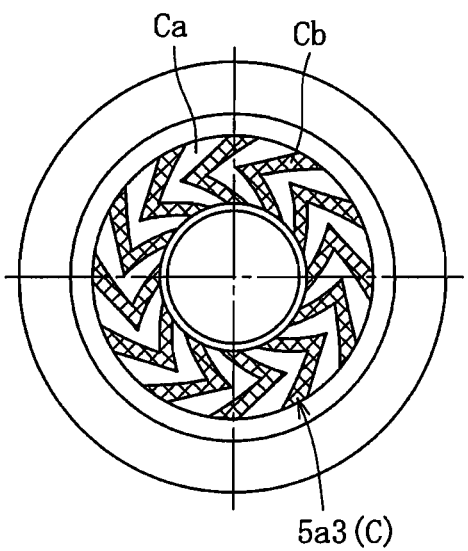
[FIG. 3B] A view of another end surface of the inner member illustrated in FIG. 2.

Further, on a second end surface 5a3 (end surface on the right side of FIG. 2) of the thick portion 5a, there is provided an annular thrust bearing surface C to form a second thrust-bearing gap between the second end surface 5a3 and another end surface of the outer member 6, which faces the second end surface 5a3. On the thrust bearing surface C, there is formed a thrust dynamic pressure generating portion for generating a dynamic pressure action with respect to the lubricating oil interposed in the second thrust-bearing gap. As illustrated in FIG. 3B, the thrust dynamic pressure generating portion is formed of dynamic pressure grooves Ca each bent into a V-shape, and projecting peak portions Cb (indicated by cross-hatching in FIG. 3B) defining the dynamic pressure grooves Ca, the dynamic pressure grooves Ca and the peak portions Cb being alternately arrayed in the circumferential direction. The thrust dynamic pressure generating portion exhibits a herringbone pattern as a whole.

The outer member 6 includes a first outer member 7 having an L-shape in cross-section, in which a disk-like radial portion 7b extending radially inward is integrally provided at one end (left end in FIG. 2) of a cylindrical axial portion 7a extending in the axial direction, and a disk-like second outer member 8 arranged on an inner periphery of the other end (right end in FIG. 2) of the axial portion 7a. The second outer member 8 is fixed onto an inner peripheral surface on the other end side of the axial portion 7a by appropriate means such as bonding, press-fitting, or press-fit bonding (press-fit fixation with adhesive being interposed). An outer peripheral surface of the first outer member 7 is formed as a radially-uniform cylindrical surface, and the mounting surface with respect to the static-side member is provided over a part or the entirety of the outer peripheral surface. There is no particular limitation on forming materials for the first outer member 7 and the second outer member 8, but here, in terms of cost reduction of the sliding bearing 4, each of the first outer member 7 and the second outer member 8 is made of a resin.

In a state of a finished product illustrated in FIG. 2, the radial portion 7b of the first outer member 7 is arranged on one end side of the thick portion 5a so as to be axially engageable with the first end surface 5a2 of the thick portion 5a of the inner member 5. Further, the second outer member 8 is arranged on another end side of the thick portion 5a so as to be axially engageable with the second end surface 5a3 of the thick portion 5a of the inner member 5. With this structure, in this embodiment, the radial portion 7b of the first outer member 7 and the second outer member 8 respectively form flange portions F1 and F2 engageable with the thick portion 5a as the projecting portion P on both the axial sides.

Between an inner peripheral surface 7b2 of the radial portion 7b (flange portion F1) of the first outer member 7 and an outer peripheral surface 5b1 of the first thin portion 5b of the inner member 5, which faces the inner peripheral surface 7b2, and between an inner peripheral surface 8b of the second outer member 8 (flange portion F2) and an outer peripheral surface 5c1 of the second thin portion 5c of the inner member 5, which faces the inner peripheral surface 8b, there are respectively formed sealing gaps S and S. Each of the sealing gaps S and S has a function of absorbing an amount of a volume change (buffering function) caused by a temperature change of the lubricating oil filling an interior space of the sliding bearing 4. An oil level of the lubricating oil is constantly maintained within an axial range of each of the sealing gaps S and S.

Each of the inner peripheral surfaces 7b2 and 8b of both the flange portions F1 and F2 is formed into a shape of a radially-uniform cylindrical surface extending along an axial line. Meanwhile, each of the outer peripheral surfaces 5b1 and 5c1 of the inner member 5, which face the inner peripheral surfaces 7b2 and 8b, is formed into a shape of a tapered surface gradually increasing in diameter toward a bearing inner side. With such a structure, the sealing gap S exhibits a wedge-like shape in which a gap width thereof gradually decreases toward the bearing inner side. Owing to the wedge-like shape of the sealing gap S, the lubricating oil retained in the sealing gap S is drawn into the bearing inner side by a drawing-in effect caused by a capillary force. Thus, the lubricating oil is prevented from leaking from the sealing gap S to the extent possible. Note that, although not shown, in order to reliably prevent the lubricating oil from leaking from the sealing gap S, oil repellent films may be formed on the end surfaces of the flange portions F1 and F2 adjacent to the sealing gaps S and S and on the end surfaces of the inner member 5.

When the rotary shaft 2 is rotated in the sliding bearing unit 1 incorporating the sliding bearings 4 and 4 each structured as described above, a radial bearing gap is formed between the radial bearing surface A provided on the outer peripheral surface 5a1 of the thick portion 5a (projecting portion P) of the inner member 5 and an inner peripheral surface 7a1 of the axial portion 7a of the first outer member 7, which faces the radial bearing surface A. Then, in accordance with rotation of the rotary shaft 2, an oil film is formed in the radial bearing gap. In this way, there is formed a radial bearing portion R which supports the rotary shaft 2 and the inner member 5 with respect to the static-side member and the outer member 6 in a non-contact manner in a radial direction.

Simultaneously, between the thrust bearing surface B provided on the first end surface 5a2 of the thick portion 5a of the inner member 5 and an end surface 7b1 of the radial portion 7b (flange portion F1) of the first outer member 7, which faces the thrust bearing surface B, and between the thrust bearing surface C provided on the second end surface 5a3 of the thick portion 5a and an end surface 8a of the second outer member 8 (flange portion F2), which faces the thrust bearing surface C, there are respectively formed a first thrust bearing gap and a second thrust bearing gap.

Then, in accordance with the rotation of the rotary shaft 2, pressures of oil films formed in both the thrust bearing gaps are respectively increased by the dynamic pressure actions of the dynamic pressure grooves Ba and Ca. As a result, there are formed a first thrust bearing portion T1 and a second thrust bearing portion T2 which support the rotary shaft 2 and the inner member 5 with respect to the static-side member and the outer member 6 in a non-contact manner in one thrust direction and another thrust direction.

As described above, the sliding bearing 4 according to the present invention is capable of supporting the rotary shaft 2 in a freely rotatable manner in the radial direction with two members: the inner member 5 and the outer member 6 (strictly speaking, three members as a whole because the outer member 6 is formed of two members combined with each other). Thus, the number of components can be markedly reduced in comparison with those of conventional roller bearings, and hence a demand for cost reduction can be satisfied. Further, in the present invention, the radial bearing gap, in which the lubricating oil is interposed, is formed between the inner member 5 and the outer member 6 in accordance with the rotation of the rotary shaft 2, and hence the rotary shaft 2 is supported to be freely rotatable in the radial direction by the oil film of the lubricating oil formed in the radial bearing gap. Thus, a situation in which abnormal noise is caused by contact of members during bearing operation is effectively prevented, which can contribute to further quietness. In addition, the rotary shaft 2 is supported to be freely rotatable with respect to the outer member 6 (static-side member) through intermediation of the inner member 5. Thus, when the inner member 5 is formed with high accuracy, the rotary shaft 2 can be supported with high accuracy irrespective of an accuracy of an outer peripheral surface 2a of the rotary shaft 2.

Further, the sealing gaps S and S for maintaining the oil level of the lubricating oil are provided on both the axial sides of the radial bearing gap, and hence the lubricating oil interposed in the radial bearing gap and the thrust bearing gaps is prevented from leaking to an outside. Thus, desired bearing performance can be stably maintained. Each of the sealing gaps S and S has a seal structure of what is called a non-contact type in which the lubricating oil is prevented from leaking to the outside without bringing the members into contact with each other. Thus, generation of abnormal noise and an increase in rotational torque, which may occur in a case where a seal structure of what is called a contact type is employed, do not occur.

Still further, at least a part of ("the entirety of" in this embodiment) the mounting surface 9 of the inner member 5 with respect to the rotary shaft 2 is made of a metal, and hence fixing strength of the inner member 5 with respect to the rotary shaft 2 is increased. As a result, high support accuracy is stably maintained over a long period of time. In other words, for example, when the inner member 5 is made of a resin and the mounting surface 9 thereof is press-fitted to the rotary shaft 2, there is a risk that creep occurs along with the elapse of time and fixing strength is deteriorated. In addition, for example, even when the inner member 5 is made of a resin and the mounting surface 9 thereof is fixed to the rotary shaft 2 by bonding, it is difficult to secure high fixing strength therebetween. In contrast, according to the structure of the present invention, such problems do not occur and high support accuracy is stably maintained over a long period of time.

Yet further, the thick portion 5a is provided as the projecting portion P to the inner member 5, while the flange portions F1 and F2 (radial portion 7b of the first outer member 7 and the second outer member 8) to be engaged in the axial direction with the end surfaces 5a2 and 5a3 of the thick portion 5a are provided to the outer member 6. Thus, the inner member 5 and the outer member 6 are effectively prevented from being separated from each other, and desired bearing performance can be stably maintained.

Yet further, the thrust bearing gaps of the thrust bearing portions T1 and T2 are formed between the end surfaces of the projecting portion P and the end surfaces of the flange portions F1 and F2, which face each other. With this, the rotary shaft 2 is supported to be freely rotatable in a non-contact manner in both the thrust directions, and hence supportability can be further enhanced without deteriorating quietness.

Yet further, the thick portion 5a is provided as the projecting portion P to the inner member 5, and the flange portions F1 and F2 are provided to the outer member 6. In addition, the radial bearing gap is formed between the outer peripheral surface 5a1 of the thick portion 5a (strictly speaking, radial bearing surface A provided thereon) and the inner peripheral surface 7a1 of the outer member 6, which faces the outer peripheral surface 5a1, and the sealing gaps S and S are provided respectively between the inner peripheral surfaces 7b2 and 8b of the flange portions F1 and F2 and the outer peripheral surfaces 5b1 and 5b2 of the inner member 5, which face the inner peripheral surfaces 7b2 and 8b. With this, the radial bearing gap (radial bearing portion R) can be positioned on a radially outer side and the sealing gaps S and S can be positioned on a radially inner side in comparison with those in a case where, in contrast to this embodiment, the projecting portion P is provided to the outer member 6 and the flange portions F1 and F2 are provided to the inner member 5. Thus, a support area of the radial bearing portion R can be increased, and hence supportability of the radial bearing portion R (rotational accuracy in the radial direction) can be enhanced. In addition, a centrifugal force to act on the lubricating oil in the sealing gaps S and S in accordance with the rotation of the rotary shaft 2 is reduced, and hence the lubricating oil is more effectively prevented from leaking from the sealing gaps S and S.

Note that, in this embodiment, the thrust dynamic pressure generating portions formed of the dynamic pressure grooves Ba and Ca in a herringbone pattern are formed respectively in the thrust bearing surfaces B and C provided on both the end surfaces 5a2 and 5a3 of the thick portion 5a as the projecting portion P. In this context, at least one of the dynamic pressure grooves Ba and Ca may be formed in a spiral pattern of a pump-in type (not shown). With this, the lubricating oil interposed in the thrust bearing gaps is drawn from the radially inner side toward the radially outer side in accordance with the rotation of the rotary shaft 2. In addition, one ends on the bearing inner side of the sealing gaps S and S respectively communicates to radially-inner end portions of the thrust bearing gaps, and hence a drawing-in force toward the bearing inner side acts on the lubricating oil in the sealing gaps S and S. Thus, the lubricating oil can be more effectively prevented from leaking from the sealing gaps S and S.

In this embodiment, by forming, as cylindrical surfaces, the radial bearing surface A provided on the outer peripheral surface 5a1 of the thick portion 5a (projecting portion P) and the inner peripheral surface 7a1 of the axial portion 7a of the first outer member 7, which face each other across the radial bearing gap, the radial bearing portion R is formed of what is called a cylindrical bearing. Alternatively, a radial dynamic pressure generating portion formed of dynamic pressure grooves and the like maybe formed in one of the abovementioned two surfaces facing each other across the radial bearing gap (not shown). With this, the radial bearing portion R can be formed of what is called a dynamic pressure bearing, and hence rotational accuracy in the radial direction (supportability of the radial bearing portion R) can be further enhanced. Further, the thrust dynamic pressure generating portions are provided respectively in the thrust bearing surfaces B and C provided on both the end surfaces 5a2 and 5a3 of the thick portion 5a, but at least one of both the thrust dynamic pressure generating portions may be formed in at least one of the end surface 7b1 of the radial portion 7b of the first outer member 7 and the end surface 8a of the second outer member 8, which respectively face each other across the thrust bearing gaps. The same applies to embodiments described below.

Further, in this embodiment, description is made of a case where each of the thrust bearing portions T1 and T2 is formed of a dynamic pressure bearing in which a dynamic pressure action is generated by the thrust dynamic pressure generating portion formed of dynamic pressure grooves arrayed in a herringbone pattern with respect to the lubricating oil interposed in the thrust bearing gap. Alternatively, at least one of the thrust bearing portions T1 and T2 may be formed of other conventional dynamic pressure bearings such as what is called a step bearing and a wave bearing. The same applies to the embodiments described below.

Hereinabove, although description is made of one embodiment of the sliding bearing 4 according to the present invention, the present invention is not limited to the above-mentioned embodiment. In the following, description is made of the sliding bearing 4 according to other embodiments of the present invention. The members and parts having substantially the same functions as those in the embodiment described hereinabove are denoted by the same reference symbols, and redundant description thereof is omitted.

Figure 4:
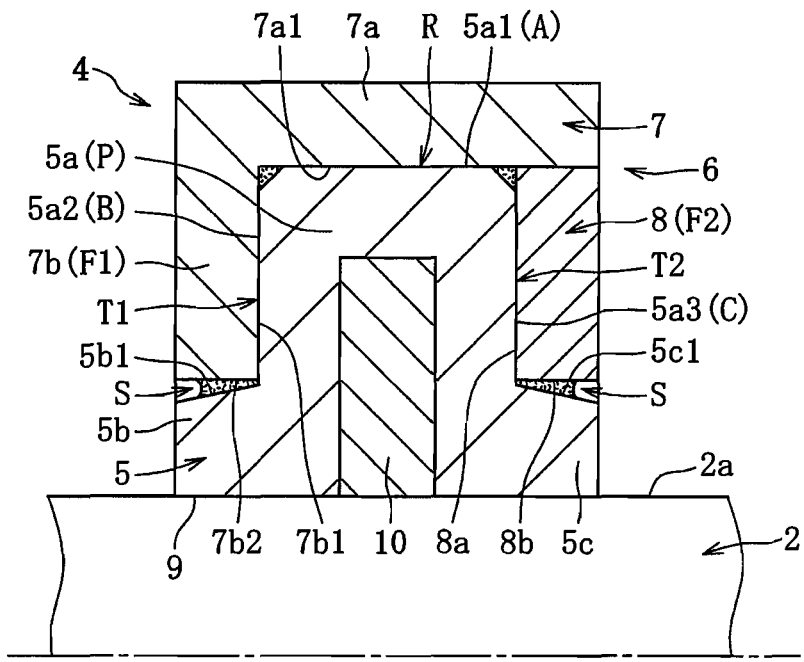
[FIG. 4] A sectional view of the sliding bearing according to a second embodiment of the present invention.

FIG. 4 is a sectional view of the sliding bearing 4 according to a second embodiment of the present invention. The sliding bearing 4 illustrated in FIG. 4 is different from that illustrated in FIG. 2 mainly in that the inner member 5 is a resin injection-molded product including a core metal 10. The core metal 10 has an annular shape extending in the radial direction, and forms a part of the thick portion 5a as the projecting portion P by being arranged at a substantially axial central portion of the inner member 5. With such a structure, parts of the inner member 5 except the core metal 10 are substantially made uniform in thickness. Thus, an adverse effect which may occur in a case where the parts of the inner member 5 except the core metal 10 are formed by injection molding of a resin can be prevented. Specifically, a situation in which variation in molding shrinkage amount causes deterioration of shape accuracy can be prevented.

Further, an inner peripheral surface of the core metal 10 is exposed to the mounting surface 9 with respect to the rotary shaft 2. Thus, similarly to the sliding bearing 4 according to the above-mentioned first embodiment, it is possible to avoid a situation in which a fixing force of the inner member 5 with respect to the rotary shaft 2 decreases or becomes insufficient.

Note that, the inner member 5 according to this embodiment is formed in a manner that the other parts thereof except the core metal 10 are formed by injection molding of a resin together with the core metal 10 as an insert component. With this, molding of the inner member 5 (strictly speaking, parts except the core metal 10 thereof) and fixation of the core metal 10 can be completed in a single step, and hence the inner member 5 of this type can be mass-produced at low cost. At the time of injection molding (insertion molding) of the inner member 5, thrust dynamic pressure generating portions maybe molded with respect to both the end surfaces 5a2 and 5a3 of the inner member 5. Alternatively, when the radial bearing portion R is formed of a dynamic pressure bearing, a radial dynamic pressure generating portion may be molded with respect to the outer peripheral surface Sal of the inner member 5.

Figure 5:
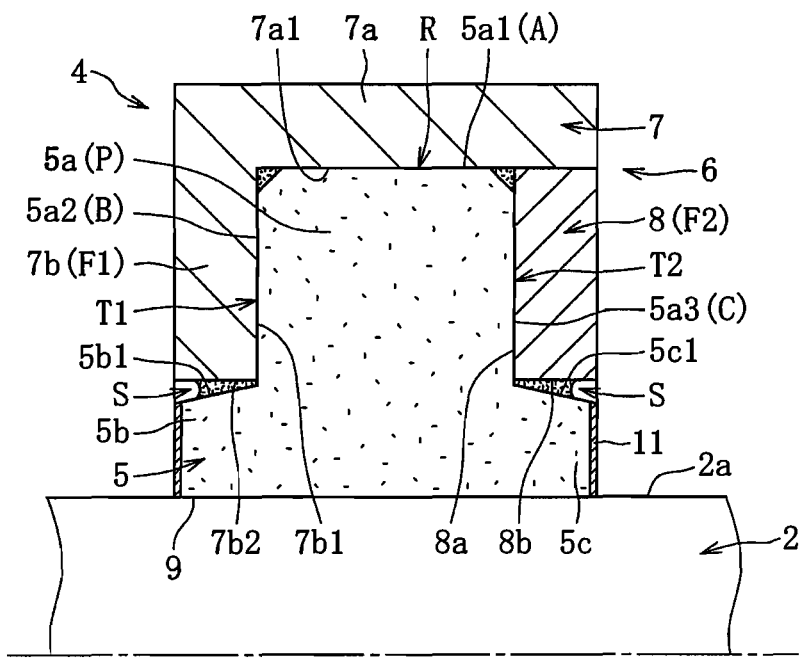
[FIG. 5] A sectional view of the sliding bearing according to a third embodiment of the present invention.

FIG. 5 is a sectional view of the sliding bearing 4 according to a third embodiment of the present invention. The sliding bearing 4 illustrated in FIG. 5 is structurally different from that in the first embodiment illustrated in FIG. 2 mainly in that the inner member 5 is formed of a porous body made of a sintered metal. With this structure, the lubricating oil can be retained by a porous composition (inner pores) of the inner member 5. When the rotary shaft 2 is rotated, a centrifugal force acts on the lubricating oil retained in the inner pores of the inner member 5, and hence the lubricating oil actively seeps from surface pores of the outer peripheral surface Sal of the thick portion 5a (projecting portion P) into the radial bearing gap. Thus, in particular, the radial bearing gap can be constantly filled with ample lubricating oil, and hence bearing performance of the radial bearing portion R can be maintained with high accuracy.

In this case, as described above, in accordance with the rotation of the rotary shaft 2, the lubricating oil actively seeps into the radial bearing gap. In this way, by sequentially supplying the lubricating oil into the radial bearing gap in accordance with the rotation of the rotary shaft 2, a type of dynamic pressure action acts on the oil film to be formed in the radial bearing gap. Thus, even when the radial dynamic pressure generating portion is not provided on any one of the two surfaces facing each other across the radial bearing gap, bearing rigidity in the radial direction can be enhanced.

In this embodiment, the entirety of the inner member 5 is formed of a porous body made of a sintered metal, and surfaces of the inner member 5, which are exposed to the outside (in this case, end surfaces of the thin portions 5b and 5c of the inner member 5), undergo pore sealing treatment. In this way, the lubricating oil is prevented from seeping from surface pores of those surfaces. Filling treatment, coating forming treatment, pore-sealing-agent impregnation treatment, and the like can be employed as the pore sealing treatment. In this embodiment, by forming a coating 11 on the end surface of each of the thin portions 5b and 5c, the lubricating oil is prevented from leaking from those surfaces. Note that, when the coating 11 is formed of an oil repellent film, the lubricating oil is more effectively prevented from leaking from the sealing gaps S and S adjacent thereto. Although not shown, the pore sealing treatment may be performed on a part or the entirety of the inner peripheral surface (mounting surface 9 with respect to the rotary shaft 2) of the inner member 5 for the purpose of preventing the lubricating oil from leaking from the mounting surface 9 and deterioration of mounting strength of the inner member 5 with respect to the rotary shaft 2 caused thereby.

Figure 6:
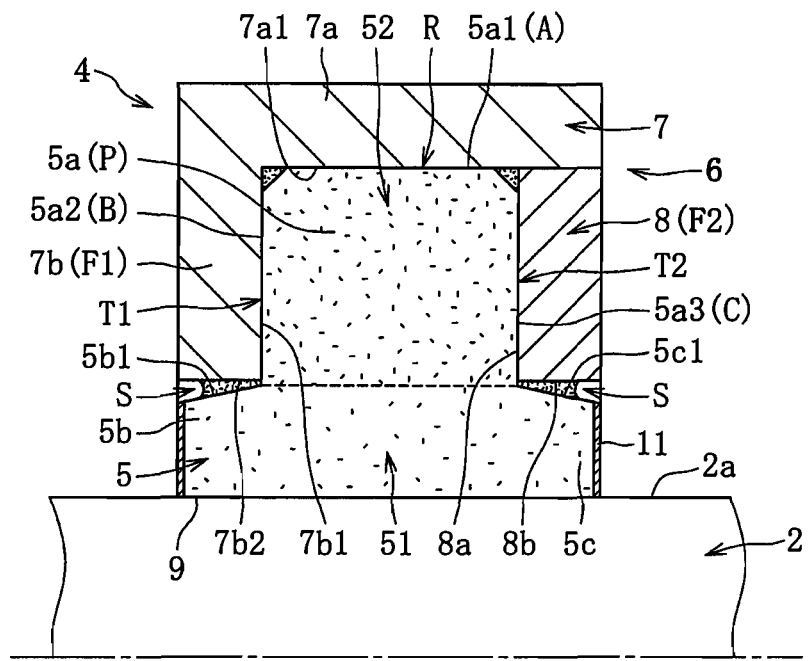
[FIG. 6] A sectional view of the sliding bearing according to a fourth embodiment of the present invention.

FIG. 6 is a sectional view of the sliding bearing 4 according to a fourth embodiment of the present invention. This embodiment is the same as the embodiment illustrated in FIG. 5 in that the inner member 5 is formed of a porous body made of a sintered metal. However, a radially inner part having the mounting surface 9 with respect to the rotary shaft 2 is formed with low density, and a radially outer part to function as the projecting portion P and form the radial bearing gap and the thrust bearing gaps between the projecting portion P and the outer member 6 is formed with high density. In this embodiment, the inner member 5 is formed by coupling a low density portion 51 formed into a cylindrical shape and a high density portion 52 having a large-diameter cylindrical shape and accommodating the low density portion 51 on an inner periphery thereof to each other by appropriate means.

On both the end surfaces of the inner member 5, which are formed of the low density portion 51, the coatings 11 are formed as the pore sealing treatment as in the embodiment illustrated in FIG. 5. With this, the lubricating oil can be prevented from leaking to the outside through the surface pores in both the end surfaces of the inner member 5. Although not shown as in the case of FIG. 5, an inner peripheral surface (mounting surface 9 with respect to the rotary shaft 2) of the low density portion 51 may undergo the pore sealing treatment.

With the above-mentioned structure, as in the embodiment illustrated in FIG. 5, a centrifugal force acts on the lubricating oil retained in the inner pores of the inner member 5 during the rotation of the rotary shaft 2. Thus, the radial bearing gap can be constantly filled with ample lubricating oil, and hence the bearing performance of the radial bearing portion R can be maintained with high accuracy. In addition, the high density portion 52 is arranged to face the radial bearing gap and both the thrust bearing gaps. With this, what is called pressure absence is suppressed, and hence bearing rigidity of each of the bearing portions R, T1, and T2 can be enhanced.

Further, when the bearing is stopped, the lubricating oil retained in the inner pores of the low density portion 51 is drawn-in toward the high density portion 52 by a capillary force, and hence leakage of the lubricating oil is more effectively suppressed or prevented. When such a suction effect and a retention effect of the high density portion 52 with respect to the lubricating oil are sufficiently obtained, even without provision of the sealing gaps S and S (seal structures) as in the illustrated example, the lubricating oil can be effectively prevented from leaking (illustration of a structure free from the seal structures is omitted). In this case, the bearing structure can be simplified and cost reduction of the sliding bearing 4 can be achieved.

Note that, in order to reliably obtain the above-mentioned functions and effects, it is necessary that the lubricating oil be flowable between the low density portion 51 and the high density portion 52. Thus, in a structure in which the separate low density portion 51 and the high density portion 52 are integrated with each other as in this embodiment, it is necessary to achieve a fitting state without interposing an adhesive over the entirety of a boundary portion therebetween. In other words, press-fitting, partial bonding, partial welding, and the like are employed as a coupling method for the low density portion 51 and the high density portion 52. Note that, means for obtaining the inner member 5 structured in this way is not limited thereto. For example, the inner member 5 can be obtained also by charging metal powders each having a different grain size into a powder charging portion (cavity) of a die for a powder-press-molded body and then compressing and sintering the metal powders. Specifically, in the cavity, a metal powder having a relatively large grain size may be charged into a region to form the low density portion 51, a metal powder having a relatively small grain size may be charged into a region to form the high density portion 52. Then, compressing and sintering of the metal powders may be performed.

Figure 7:
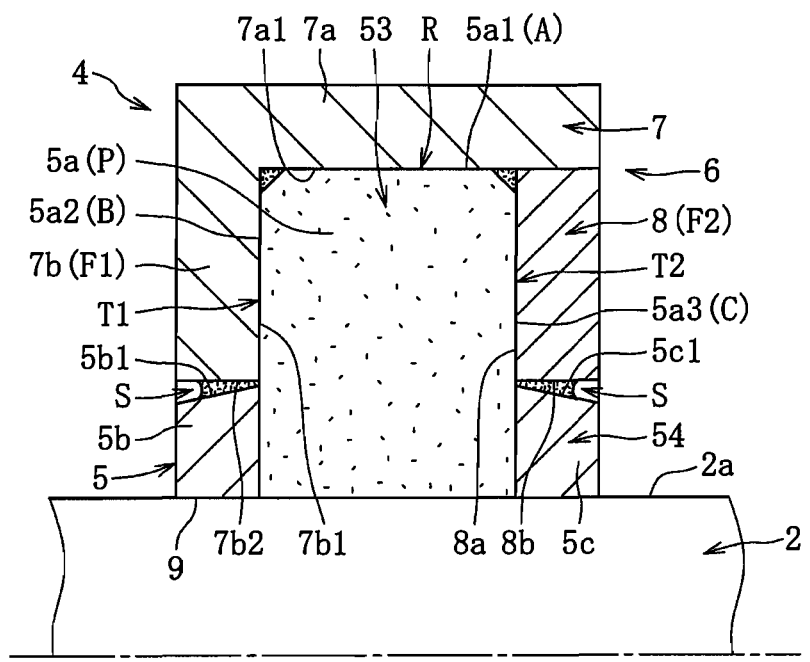
[FIG. 7] A sectional view of the sliding bearing according to a fifth embodiment of the present invention.

FIG. 7 is a sectional view of the sliding bearing 4 according to a fifth embodiment of the present invention. The sliding bearing 4 illustrated in FIG. 7 is structurally different from those in the embodiments described above in the following points: the inner member 5 is formed of a sintered-metal porous portion 53 to form the projecting portion P (thick portion 5a) and a non-porous molded portion 54 formed by injection molding of a resin after insertion of the porous portion 53, the porous portion 53 being provided with the radial bearing surface A to form a radial bearing gap between the porous portion 53 and the inner peripheral surface of the outer member 6, and provided with (a part of) the mounting surface 9 with respect to the rotary shaft 2; and the molded portion 54 forms the thin portions 5b and 5c and covers portions of the porous portion 53, which are exposed to the outside (in this case, radially inner regions of both the end surfaces thereof). When the molded portion 54 is molded to cover the outward exposed surfaces of the porous portion 53, the lubricating oil can be prevented from leaking from the outward exposed surfaces of the porous portion 53 even without additional pore sealing treatment.

In this embodiment, a radial bearing gap of the radial bearing portion R is formed between the outer peripheral surface Sa1 of the inner member 5, which is formed of the porous portion 53, and the inner peripheral surface 7a1 of the axial portion 7a of the first outer member 7. Thus, during the rotation of the rotary shaft 2, as in the embodiments illustrated in FIGS. 5 and 6, a centrifugal force acts on the lubricating oil retained in the inner pores of the inner member 5 (porous portion 53). With this, the radial bearing gap can be constantly filled with ample lubricating oil, and hence the bearing performance of the radial bearing portion R can be maintained with high accuracy. Further, the thrust bearing gap of the first thrust bearing portion T1 is formed between the thrust bearing surface B provided on the first end surface 5a2 of the inner member 5, which is formed of the porous portion 53, and the end surface 7b1 of the radial portion 7b (flange portion F1) of the first outer member 7, which faces the thrust bearing surface B, and the thrust bearing gap of the second thrust bearing portion T2 is formed between the thrust bearing surface C provided on the second end surface 5a3 of the inner member 5 and the end surface 8a of the second outer member 8 (flange portion F2), which faces the thrust bearing surface C.

In addition, on the non-porous molded portion 54 to cover the outward exposed surfaces of the porous portion 53, there are formed tapered outer peripheral surfaces 5b1 and 5c1 gradually increasing in diameter toward the bearing inner side. The sealing gaps S and S maintaining the oil level of the lubricating oil are formed between the tapered outer peripheral surface 5b1 and the inner peripheral surface 7b2 of the radial portion 7b of the first outer member 7 and between the tapered outer peripheral surface 5c1 and the inner peripheral surface 8b of the second outer member 8. With this, the lubricating oil no longer seeps from the seal-gap forming surfaces (in this case, 5b1 and 5c1) of the inner member 5 into the sealing gaps S and S. Thus, a desired sealing function is stably maintained.

Although not shown in illustration, as in the fourth embodiment illustrated in FIG. 6, a radially inner side and a radially outer side of the porous portion 53 in this embodiment can be formed with low density and high density, respectively.

Figure 8:
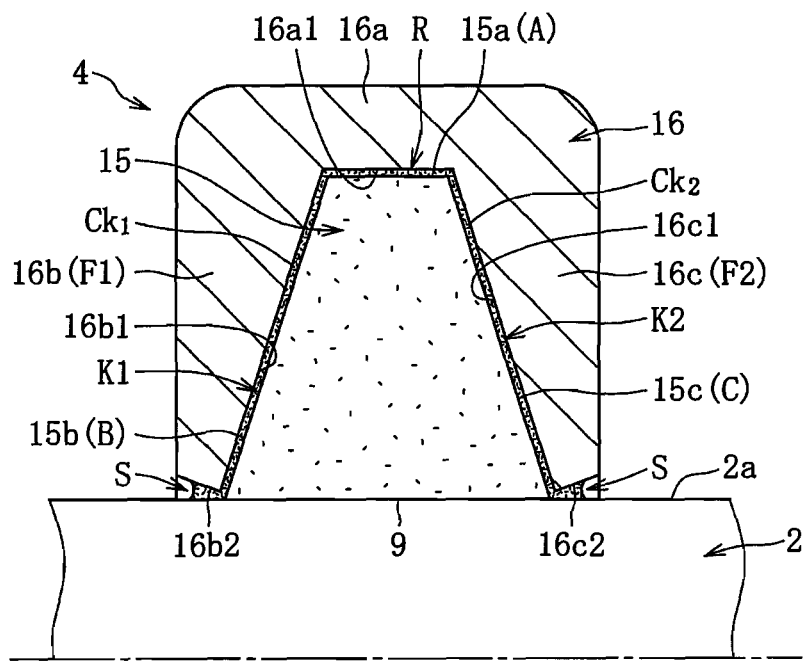
[FIG. 8] A sectional view of the sliding bearing according to a sixth embodiment of the present invention.

FIG. 8 is a sectional view of the sliding bearing 4 according to a sixth embodiment of the present invention. In the sliding bearing 4 according to this embodiment, an inner member 15 having the mounting surface 9 with respect to the rotary shaft 2 is formed of a porous body (in this case, porous body made of a sintered metal), and formed into a trapezoidal shape in cross-section gradually reducing in axial dimension toward the radially outer side. In this embodiment, the projecting portion P is formed of the inner member 15 itself. Meanwhile, an outer member 16 is formed into a substantially C-shape in cross-section of integrally including an axial portion 16a extending in the axial direction, and a first radial portion 16b and a second radial portion 16c respectively as the flange portions F1 and F2 extending radially inward from both ends of the axial portion 16a and engaged with the inner member 15 on both axial sides. An outer peripheral surface of the axial portion 16a is formed as a radially-uniform cylindrical surface, and the mounting surface with respect to the static-side member is provided at a part or the entirety of the outer peripheral surface.

Both end surfaces 15b and 15c of the inner member 15 are each formed as a tapered surface inclined radially outward in a direction of coming close to each other. Almost the entirety of an end surface 16b1 of the first radial portion 16b and almost the entirety of an end surface 16c1 of the second radial portion 16c of the outer member 16 respectively face both the end surfaces 15b and 15c of the inner member 15 at a certain interval. In other words, the end surfaces (end surfaces on the bearing inner side) 16b1 and 16c1 of the first radial portion 16b and the second radial portion 16c, respectively, are formed as tapered surfaces corresponding respectively to the tapered end surfaces 15b and 15c of the inner member 15. Further, an inner peripheral surface 16b2 of the first radial portion 16b and an inner peripheral surface 16c2 of the second radial portion 16c are formed as tapered surfaces gradually reducing in diameter toward the bearing inner side, and respectively form the wedge-like sealing gaps S and S between the inner peripheral surfaces 16b2 and 16c2 and the outer peripheral surface 2a of the rotary shaft 2.

When the rotary shaft 2 is rotated in a case where such a structure is employed, a radial bearing gap is formed between the radial bearing surface A provided on an outer peripheral surface 15a of the inner member 15 and an inner peripheral surface 16a1 of the axial portion 16a of the outer member 16. Then, in accordance with rotation of the rotary shaft 2, an oil film of the lubricating oil is formed in the radial bearing gap. In this way, the radial bearing portion R which supports the rotary shaft 2 and the inner member 15 with respect to the static-side member and the outer member 16 in a non-contact manner in the radial direction is formed.

Figure 9:
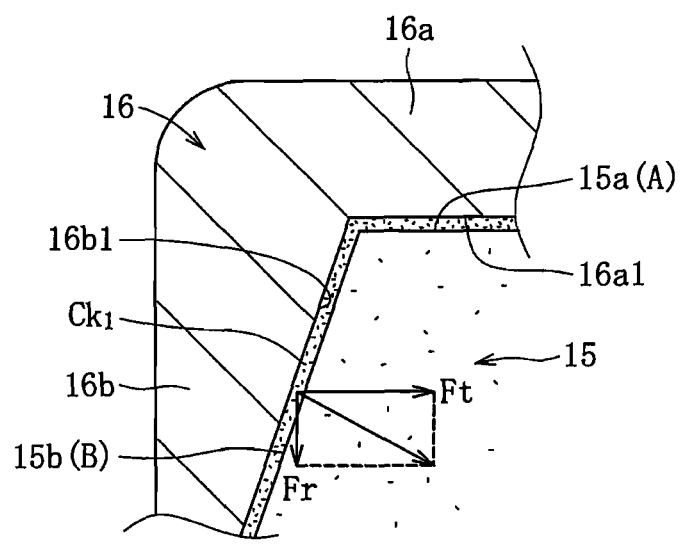
[FIG. 9] A schematic view illustrating a support form of the sliding bearing illustrated in FIG. 8.

Simultaneously, between the one tapered end surface 15b of the inner member 15 and the tapered end surface 16b1 of the first radial portion 16b of the outer member 16, which faces the one tapered end surface 15b, and between the another tapered end surface 15c of the inner member 15 and the tapered end surface 16c1 of the second radial portion 16c of the outer member 16, which faces the another tapered end surface 15c, there are respectively formed inclined bearing gaps $Ck_2$ and $Ck_2$ inclined radially outward in a direction of coming close to each other. Then, in accordance with the rotation of the rotary shaft 2, an oil film of the lubricating oil is formed in both the inclined bearing gaps $Ck_1$ and $Ck_2$, and as illustrated in FIG. 9, a component force Fr in the radial direction and a component force Ft in the axial direction (thrust direction) act with respect to the inner member 15. With this, there are formed a first inclined bearing portion K1 and a second inclined bearing portion K2 for respectively supporting, in a non-contact manner, the rotary shaft 2 and the inner member 15 in the radial direction and the one thrust direction and the rotary shaft 2 and the inner member 15 in the radial direction and the another thrust direction.

The sliding bearing 4 structured as described above is manufactured, for example, as follows.

Figure 10:
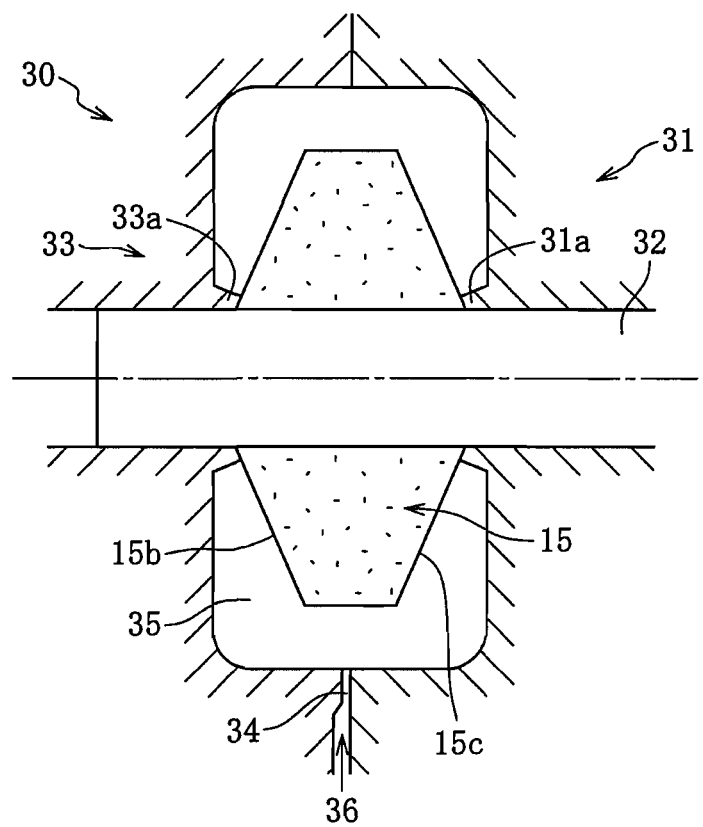
[FIG. 10] A conceptual sectional view illustrating a manufacturing step for the sliding bearing illustrated in FIG. 8.

FIG. 10 conceptually illustrates a manufacturing step for the sliding bearing 4 illustrated in FIG. 8. A molding die 30 illustrated in FIG. 10 includes, as main portions, a first die 31 and a second die 33 which relatively come close to and move apart from each other, and a core 32 passed through both the dies 31 and 33. In this case, the first die 31 forms a static side, and the second die 33 forms a movable side.

First, the inner member 15 is fitted to an outer periphery of the core 32 projected to the second die 33 side with respect to an end surface of the first die 31, and then, the inner member 15 is slid so that the another tapered end surface 15c thereof is brought into abutment with an annular protrusion 31a of the first die 31. Next, clamping is performed by bringing the second die 33 close to the first die 31. By clamping, an annular protrusion 33a of the second die 33 abuts the one tapered end surface 15b of the inner member 15. In this state, a molten resin 36 is injected and filled from a gate 34 into a cavity 35. The molten resin 36 used in this case contains, as a main component, liquid crystal polymer (LCP) which is one of crystalline resins, and various fillers such as a reinforcing material and a conducting material may be mixed therewith when necessary. The reason for using the resin material containing the liquid crystal polymer as a main component is that the liquid crystal polymer exhibits properties different from those of other resins frequently used for obtaining molded products of this type, for example, polyphenylene sulfide (PPS) and polyamide (PA). Specifically, a cylindrical body formed by injection molding of a resin material containing the liquid crystal polymer as a main component undergoes molding shrinkage, which occurs at the time of solidification, generated in a direction of increasing the inner diameter dimension. In other words, as for the structure in this embodiment, the outer member 16 undergoes molding shrinkage in a direction of being separated from the inner member 15.

By opening the die after completion of the injection and filling of the molten resin 36 into the cavity 35 and solidification of the molten resin 36, there is obtained a single product of the inner member 15 and the outer member 16 adhering to the outer peripheral surface 15a and both the end surfaces 15b and 15c of the inner member 15. At the time of die opening, the single product is fitted to the outer periphery of the core 32. Thus, in order to pull out the single product from the core 32, the first die 31 and the core 32 are moved relative to each other (in this case, the core 32 is retracted).

Figure 11:
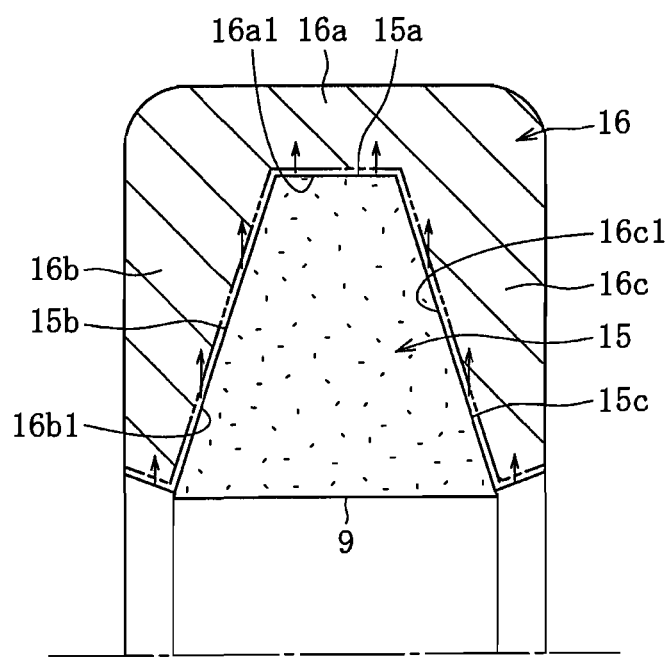
[FIG. 11] A schematic sectional view illustrating a shrink form of the sliding bearing illustrated in FIG. 8.

The outer member 16 formed integrally with the inner member 15 by molding of a resin undergoes molding shrinkage. The molding shrinkage occurs in a form indicated by a two-dot chain line in FIG. 11, in other words, in the direction of increasing the inner diameter dimension as described above. Specifically, the inner peripheral surface 16a1 of the axial portion 16a, the one tapered end surface 16b1 and an inner peripheral surface 16b2 of the first radial portion 16b, and the another tapered end surface 16c1 and the inner peripheral surface 16c2 of the second radial portion 16c, which form the outer member 16, each shrink in the direction of increasing the inner diameter dimension. In accordance therewith, the inner member 15 and the outer member 16 are released from a close-contact state, and separated from each other. As a result, gaps are formed between the inner peripheral surface 16a1 of the axial portion 16a of the outer member 16 and the outer peripheral surface 15a of the inner member 15, between the tapered end surface 16b1 of the first radial portion 16b of the outer member 16 and the one tapered end surface 15b of the inner member 15, and between the tapered end surface 16c1 of the second radial portion 16c of the outer member 16 and the another tapered end surface 15c of the inner member 15. Those gaps respectively serve as the radial bearing gap, the inclined bearing gap $Ck_1$, and the inclined bearing gap $Ck_2$ during rotation of the rotary shaft 2.

Note that, the inner member 15 arranged as an insert component in the die 30 may be impregnated with lubricating oil in advance. With this, separability of the outer member 16 and the inner member 15 at the time of molding shrinkage is enhanced. Thus, in comparison with a case where the inner member 15 that has not been impregnated with lubricating oil is used as an insert component, shape accuracy of each part of the outer member 16 is enhanced.

As described above, when the inner member 15 is used as an insert component and the outer member 16 is formed by injection molding of a resin material (specifically, resin material containing liquid crystal polymer as a main component) undergoing molding shrinkage in the direction of radially increasing the inner periphery surface, gaps each having a width corresponding to a width of the radial bearing gap can be formed between the inner member 15 and the outer member 16 in accordance with the molding shrinkage of the outer member 16. Thus, it is possible to save time and effort for producing the inner member 15 and the outer member 16 separately and with high accuracy.

Further, each of both the end surfaces 15b and 15c of the inner member 15 is formed as a tapered surface inclined radially outward in the direction of coming close to each other, and the first radial portion 16b and the second radial portion 16c to serve as the flange portions F1 and F2 for covering the tapered end surfaces 15b and 15c are formed integrally (with the axial portion 16a) by injection molding. Thus, in accordance with molding shrinkage of both the radial portions 16b and 16c, the inclined bearing gaps $Ck_1$ and $Ck_2$ are formed on both the axial sides of the inner member 15. As described above, during the rotation of the rotary shaft 2, the oil films of the lubricating oil, which are formed in the inclined bearing gaps $Ck_1$ and $Ck_2$ (each having the component force Fr in the radial direction and the component force Ft in the thrust direction), support the inner member 15 in a non-contact manner with respect to the outer member 16. Thus, rotational accuracy is further enhanced. Further, in the sliding bearing 4 thus obtained, the outer member 16 and the inner member 15 are engaged with each other in the axial direction, and hence prevented from being separated from each other. As a result, a bearing structure of high reliability is achieved.

Figure 12:
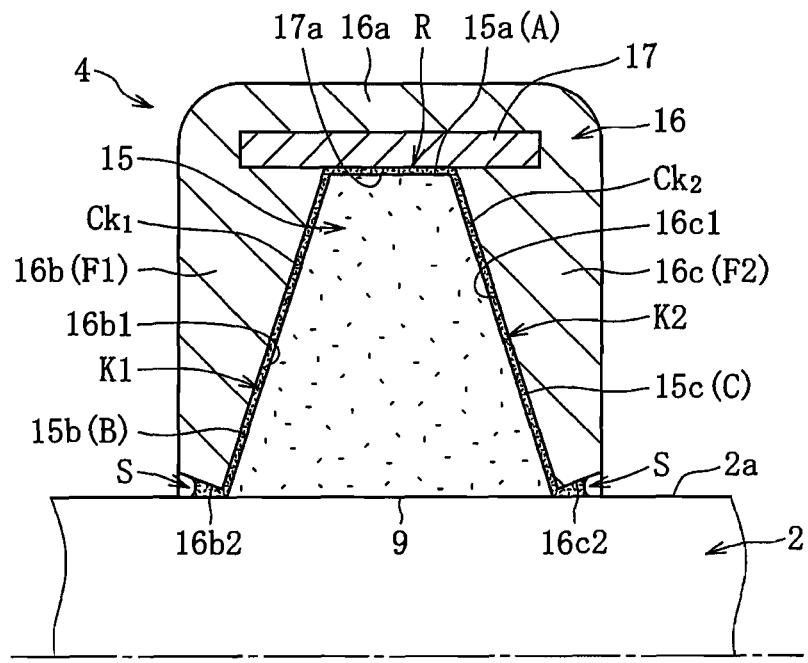
[FIG. 12] A sectional view of the sliding bearing according to a seventh embodiment of the present invention.
Figure 13:
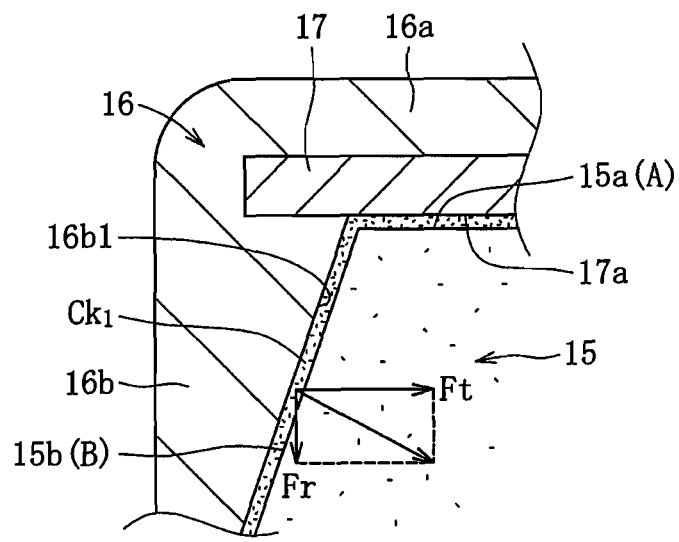
[FIG. 13] A schematic view illustrating a support form of the sliding bearing illustrated in FIG. 12.

FIG. 12 is a sectional view of the sliding bearing 4 according to a seventh embodiment of the present invention. The sliding bearing 4 in this embodiment is a modification of the sliding bearing 4 illustrated in FIG. 8, and structurally different from the sliding bearing 4 illustrated in FIG. 8 mainly in that the outer member 16 has a hybrid structure made of a resin and a metal and including a core metal 17. The core metal 17 is formed into a cylindrical shape extending along an axial line of the rotary shaft 2. As illustrated in FIG. 13 on an enlarged scale, an axial partial region of an inner peripheral surface 17a thereof is exposed to the inner peripheral surface of the outer member 16, and forms a radial bearing gap of the radial bearing portion R between the axial partial region and the radial bearing surface A provided on the outer peripheral surface 15a of the inner member 15. Of the core metal 17, partial regions on both axial end sides overlap the inclined bearing gaps $Ck_1$ and $Ck_2$ in the axial direction. Note that, other structural details are substantially the same as those of the sliding bearing 4 illustrated in FIG. 8, and detailed description thereof is omitted.

The sliding bearing 4 illustrated in FIG. 12 is manufactured, for example, as follows.

Figure 14:
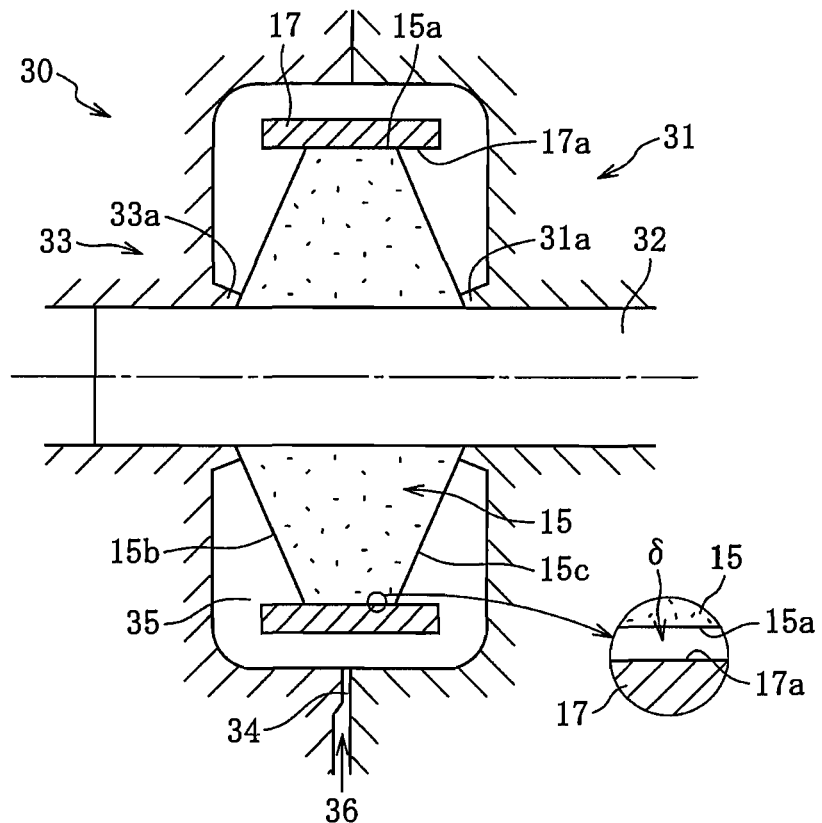
[FIG. 14] A conceptual sectional view illustrating a manufacturing step for the sliding bearing illustrated in FIG. 12.

FIG. 14 conceptually illustrates a manufacturing step for the sliding bearing 4 illustrated in FIG. 12. In this context, the molding die 30 illustrated in FIG. 14. has basically the same structure as that of the molding die 30 illustrated in FIG. 10, and hence detailed description of the structure is omitted.

First, the inner member 15 is fitted to the outer periphery of the core 32 so that the other tapered end surface 15c of the inner member 15 is brought into abutment with the annular protrusion 31a of the first die 31. Next, the cylindrical core metal 17 is arranged on the radially outer side of the inner member 15. The core metal 17 used in this case has an inner diameter dimension set to be somewhat larger than an outer diameter dimension of the outer peripheral surface 15a of the inner member 15. Thus, when the core metal 17 is fitted to the outer periphery of the inner member 15, the core metal 17 is supported in a contact manner by the outer peripheral surface 15a of the inner member 15 at one point in a circumferential direction. Meanwhile, in other circumferential regions, the core metal 17 is not held in contact with the inner member 15, and a radial gap δ is formed between the other circumferential regions and the outer peripheral surface 15a of the inner member 15. As illustrated in an enlarged part in FIG. 14, a gap width of the radial gap δ becomes a maximum at a point of being shifted in phase by 180° from the support point. The maximum gap width of the radial gap δ is set to a value at which, at the time of injecting and filling the molten resin 36 into the cavity 35, the molten resin 36 does not enter the radial gap 6 and the outer member 16 and the inner member 15 are smoothly rotatable relative to each other, specifically, approximately 20 to 40 μm in this case. In other words, the inner diameter dimension of the core metal 17 used in this case is set to approximately 20 to 40 μm larger than the outer diameter dimension of the inner member 15

After the inner member 15 and the core metal 17 are arranged as insert components in the die as described above, clamping is performed by bringing the second die 33 close to the first die 31, and then, the molten resin 36 is injected and filled from the gate 34 into the cavity 35. The molten resin 36 used in this case contains, as a main component, one resin selected among resins of types different from that of liquid crystal polymer (LCP), for example, polyphenylene sulfide (PPS), polyamide (PA), polyacetal (POM), and the like, and various fillers such as a reinforcing material and a conducting material may be mixed therewith when necessary.

When the molten resin 36 is injected into the cavity 35, a pressurizing force is imparted to the core metal 17 by injection pressure of the molten resin 36. As a result, the radial gap δ between the inner peripheral surface 17a of the core metal 17 and the outer peripheral surface 15a of the inner member 15 is maintained to have a substantially uniform width over the entire periphery. In this state, the molten resin 36 is filled into the cavity 35. Then, by opening the die after completion of filling of the molten resin 36 into the cavity 35 and solidification of the molten resin 36, there is obtained a single product of the inner member 15, the core metal 17, and the outer member 16 adhering to both the end surfaces 15b and 15c of the inner member 15. After opening the die, the single product is released from the core 32 by moving the first die 31 and the core 32 relatively to each other.

Figure 15:
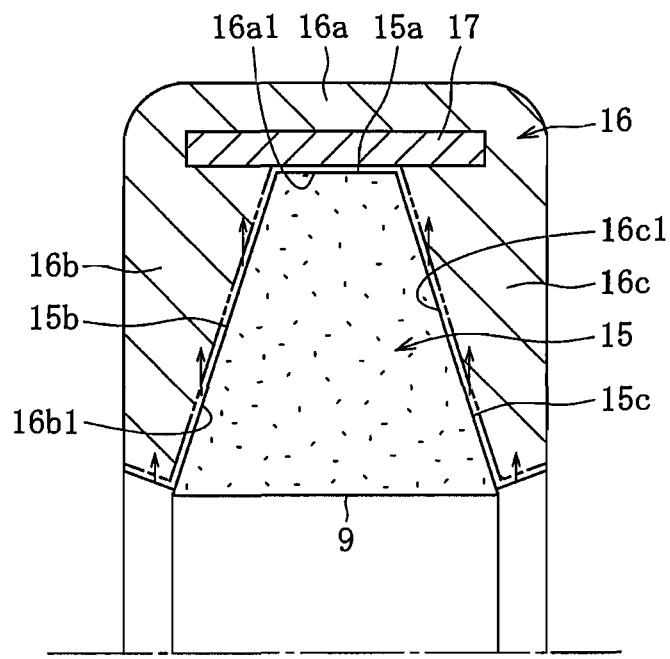
[FIG. 15] A schematic sectional view illustrating a shrink form of the sliding bearing illustrated in FIG. 12.

In the above-mentioned single product thus released, the parts formed by injection molding of a resin (resin portions) undergo molding shrinkage. The molding shrinkage occurs in a form indicated by a two-dot chain line in FIG. 15. Specifically, in the outer member 16, the one tapered end surface 16b1 and the inner peripheral surface 16b2 of the first radial portion 16b made of a resin, and the another tapered end surface 16c1 and the inner peripheral surface 16c2 of the second radial portion 16c made of the resin each shrink in the direction of increasing the inner diameter dimension. In accordance therewith, the inner member 15 and the resin portions of the outer member 16 are released from a close-contact state. As a result, gaps are formed between the tapered end surface 16b1 of the first radial portion 16b of the outer member 16 and the one tapered end surface 15b of the inner member 15 and between the tapered end surface 16c1 of the second radial portion 16c of the outer member 16 and the another tapered end surface 15c of the inner member 15. Those gaps respectively serve as the inclined bearing gaps $Ck_1$ and $Ck_2$ during rotation of the rotary shaft 2.

Note that, when a cylindrical body is formed by injection molding of the above-mentioned resin materials to be used for injection molding for the outer member 16 in this embodiment (containing PPS, PA, POM, and the like as a main component), in general, molding shrinkage does not occur in the above-mentioned form, and occurs in a direction of reducing the inner diameter dimension. Nevertheless, molding shrinkage occurs in the above-mentioned form, in other words, in the direction of increasing the inner diameter dimension. This is because the core metal 17 is arranged on the radially outer side of the inner member 15. In other words, in this case, it is conceived that molding shrinkage occurs in the resin portion with respect to the core metal 17, with the result that the inner diameter dimension is increased and the gaps are formed.

In the outer member 16, a thickness in the radial direction of the resin portion in the axial portion 16a is smaller than those of other parts, and hence the resin portion undergoes little molding shrinkage. Therefore, a situation in which the core metal 17 and the resin portion are separated from each other in accordance with the molding shrinkage of the resin portion does not occur.

The sintered-metal inner member 15 arranged as an insert component in the die 30 may be impregnated with lubricating oil in advance. This is because separability of the outer member 16 and the inner member 15 can be enhanced, and shape accuracy of each part of the outer member 16 can be enhanced.

As described above, when the core metal 17 is provided to the outer member 16, rigidity of the outer member 16 is increased. In addition, in the outer member 16, thicknesses of the parts formed by injection molding of a resin can be reduced, and hence dimensional variation of the outer member 16 along with a temperature change and the like can be suppressed. As a result, rotational accuracy can be enhanced.

Further, at the time of molding the outer member 16, by appropriately setting the thickness, the shape, and the position in arrangement of the core metal 17, a molding shrinkage amount of the parts of the outer member 16, which are formed by injection molding of a resin, can be controlled. In this way, molding accuracy of the outer member 16 can be enhanced. As in this embodiment, when the inner peripheral surface 17a of the core metal 17 is exposed to the inner peripheral surface of the outer member 16 so that the radial bearing gap of the radial bearing portion R is formed between the inner peripheral surface 17a of the core metal 17 and the outer peripheral surface 15a of the inner member 15, a situation in which the inner diameter dimension of the core metal 17 varies does not occur even when the resin portions undergo molding shrinkage. Thus, the gap width of the radial bearing gap can be easily set to a desired value. In particular, as in this embodiment, when the core metal 17 is provided to overlap the tapered end surfaces 16b1 and 16c1 of both the radial portions 16b and 16c (inclined bearing gaps $Ck_1$ and $Ck_2$) in the axial direction, molding shrinkage of both the radial portions 16b and 16c formed by injection molding of a resin occurs with respect to the inner peripheral surface of the core metal 17. Thus, width accuracy of each of the inclined bearing gaps $Ck_1$ and $Ck_2$ is enhanced, and hence rotational accuracy is further enhanced.

Note that, the shapes, the arrangements, and the like of the core metal 17 described hereinabove are merely an example. Thus, as a matter of course, those factors can be appropriately adjusted when necessary.

Hereinabove, although description is made of a case where the sliding bearing 4 according to the present invention and the sliding bearing unit 1 including the same is used for an exhaust fan motor, the sliding bearing 4 according to the present invention is suitable as bearings to be incorporated into motors in which roller bearings have been conventionally used, and are demanded to achieve further quietness and cost reduction, for example, a motor for air-conditioner fans.

REFERENCE SIGNS LIST 1 sliding bearing unit
2 rotary shaft (rotary-side member)
3 motor rotor
4 sliding bearing
5 inner member
6 outer member
9 mounting surface
10 core metal
15 inner member
16 outer member
17 core metal
51 low density portion
52 high density portion
53 porous portion
54 molded portion
Ck1, Ck2 inclined bearing gap
F1, F2 flange portion
P projecting portion
R radial bearing portion
T1, T2 thrust bearing portion
K1, K2 inclined bearing portion
S sealing gap

The invention claimed is:

1. A sliding bearing, comprising:
an inner member having an inner periphery, a mounting surface with respect to a rotary shaft at the inner periphery, and a projecting portion projecting outward in a radial direction and having a pair of axial end surfaces, at least a part of the mounting surface being made of a metal, wherein the inner member comprises a resin injection molded product including an insert component, wherein the insert component is an annular core metal and constitutes a part of the projecting portion, and wherein an inner peripheral surface of the core metal is exposed to the mounting surface with respect to the rotary shaft and is mounted and fixed to an outer periphery of the rotary shaft;
an outer member arranged on a radially outer side of the inner member and having a mounting surface with respect to a static-side member at an outer periphery and a pair of flange portions respectively engageable with the pair of axial end surfaces of the projecting portion;
a radial bearing gap which is formed between an outer peripheral surface of the projecting portion and an inner peripheral surface of the outer member in accordance with rotation of the rotary shaft, and in which a lubricating oil is interposed, the inner peripheral surface facing the outer peripheral surface; and
sealing gaps for sealing both axial sides of the radial bearing gap, the sealing gaps being formed of inner peripheral surfaces of the pair of flange portions.

2. A sliding bearing according to claim 1, wherein one of the pair of flange portions has an axial end surface facing one of the axial end surfaces of the projecting portion, and wherein, in accordance with the rotation of the rotary shaft, a thrust bearing gap is formed between the one axial end surface of the projecting portion and the facing axial end surface of the one of the pair of flange portions, the lubricating oil being interposed in the thrust bearing gap.

3. A sliding bearing according to claim 2, wherein the other of the pair of flange portions has an axial end surface facing the other of the axial end surfaces of the projecting portion, and wherein, in accordance with the rotation of the rotary shaft, another thrust bearing gap is formed between the other axial end surface of the projecting portion and the facing axial end surface of the other of the pair of flange portions, the lubricating oil being interposed in the other thrust bearing gap.

4. A sliding bearing unit, comprising the sliding bearing according to claim 1,
wherein the sliding bearing comprises a plurality of sliding bearings arranged apart in an axial direction, and
wherein a motor rotor is arranged between the plurality of sliding bearings adjacent to each other.

5. A motor, comprising the sliding bearing unit according to claim 4.

* * * * *